US012208414B2

(12) United States Patent
Zhuang

(10) Patent No.: US 12,208,414 B2
(45) Date of Patent: Jan. 28, 2025

(54) HOT MELT GUN

(71) Applicant: Guangxiang Zhuang, Shenzhen (CN)

(72) Inventor: Guangxiang Zhuang, Shenzhen (CN)

( * ) Notice: Subject to any disclaimer, the term of this patent is extended or adjusted under 35 U.S.C. 154(b) by 0 days.

(21) Appl. No.: 18/648,267

(22) Filed: Apr. 26, 2024

(65) Prior Publication Data

US 2024/0359207 A1 Oct. 31, 2024

(30) Foreign Application Priority Data

Apr. 28, 2023 (CN) ......................... 202321027027.0

(51) Int. Cl.
*B05C 17/005* (2006.01)

(52) U.S. Cl.
CPC .... *B05C 17/0053* (2013.01); *B05C 17/00546* (2013.01)

(58) Field of Classification Search
CPC ...................... B05C 17/0053; B05C 17/00546
USPC .............. 222/146.5, 180, 186, 571; 401/1, 2
See application file for complete search history.

(56) References Cited

U.S. PATENT DOCUMENTS 3,612,357 A * 10/1971 Ruskin ................ B05C 17/0053 337/392
3,743,142 A * 7/1973 Elliott ................... B29B 13/022 222/146.5
4,060,180 A * 11/1977 Wieland, Jr. ........ B05C 17/0054 222/394
4,073,469 A * 2/1978 Kodric .................. B29C 45/231 251/86
4,088,269 A * 5/1978 Schlick ..................... B60S 1/52 219/505
4,090,643 A * 5/1978 Wilkinson, Jr. .. B05C 17/00543 226/165
4,289,257 A * 9/1981 Herb .................. B05C 17/0053 222/391
D262,862 S * 2/1982 Lytle ................................ D8/71
4,314,655 A * 2/1982 Leibhard ........... B05C 17/00526 219/230
4,317,529 A * 3/1982 Leibhard ............... B29B 13/022 219/421

(Continued)

FOREIGN PATENT DOCUMENTS

CN 204735402 U 11/2015
CN 213255460 U 5/2021

(Continued)

*Primary Examiner* — Paul R Durand
*Assistant Examiner* — Michael J. Melaragno
(74) *Attorney, Agent, or Firm* — George D. Morgan

(57) ABSTRACT

The present application provides a hot melt gun including a housing having a cavity, a heating assembly mounted within the cavity and a connecting rod, wherein the housing is provided with a first through port; the heating assembly extends out of the housing from the first through port; and the connecting rod is a poor conductor of heat, and both ends thereof are respectively connected to the housing and the heating assembly, and the heating assembly is spaced apart from the housing. According to the hot melt gun provided by the present application, the heating assembly is spaced apart from the housing, a poor conductor of heat is selected as a connecting rod, the heating assembly is connected to the housing, the overall structure is simple and stable, the heat generated by the heating assembly during processing directly acts on the glue stick.

9 Claims, 4 Drawing Sheets

(56) References Cited

U.S. PATENT DOCUMENTS 4,320,857 A * 3/1982 Herb ................. B05C 17/00526 222/518
4,352,442 A * 10/1982 Leibhard ........... B05C 17/00526 219/422
4,463,877 A * 8/1984 Siwon ............... B05C 17/00526 165/47
4,493,972 A * 1/1985 Steinel .............. B05C 17/00546 219/241
4,523,705 A * 6/1985 Belanger ............. B05C 17/0053 74/141.5
4,637,745 A * 1/1987 Speisebecher ...... B05C 17/0053 401/2
4,658,991 A * 4/1987 Dziki .................. B05C 17/0053 222/391
4,660,743 A * 4/1987 Speisebecher ...... B05C 17/0053 74/160
4,706,852 A * 11/1987 Borst .................. B05C 17/0053 219/230
4,755,073 A * 7/1988 Girardin ............. B05C 17/0055 222/113
4,776,490 A * 10/1988 Wingert .............. B05C 17/0053 226/127
4,804,110 A * 2/1989 Sperry .................. B29C 48/022 222/63
4,815,636 A * 3/1989 Stede .................. B05C 17/0053 222/391
4,986,680 A * 1/1991 Melendy ............. B05C 17/0053 401/2
5,026,187 A * 6/1991 Belanger ........... B05C 17/00533 219/505
5,048,722 A * 9/1991 Lichu .................. B05C 17/0055 222/113
5,105,987 A * 4/1992 Quinn ................. B05C 17/0054 222/389
5,215,230 A * 6/1993 Lee ..................... B05C 17/0053 222/391
5,362,164 A * 11/1994 Wingert ............ B05C 17/00526 219/505
5,462,206 A * 10/1995 Kwasie ................. B29B 13/022 222/146.5
5,553,758 A * 9/1996 Melendy ............... B29B 13/022 222/536
5,688,421 A * 11/1997 Walton ................... H05B 3/141 219/241
5,895,159 A * 4/1999 Liou ................... B05C 17/0055 222/113
5,901,881 A * 5/1999 Wang .................. B05C 17/0055 222/113
5,960,996 A * 10/1999 Hsu ................... B05C 17/00546 222/113
6,065,888 A * 5/2000 Maayeh .............. B05C 17/0053 222/146.2
6,105,824 A * 8/2000 Singleton .......... B05C 17/00546 219/229
6,170,709 B1 * 1/2001 Huang .............. B05C 17/00546 222/146.5
6,415,958 B1 * 7/2002 Donley ................. B05B 12/002 222/146.5
6,457,889 B1 * 10/2002 Lin ..................... B05C 17/0053 401/2
6,460,736 B1 * 10/2002 D'Agostino ...... B05C 17/00533 222/391
6,558,059 B1 * 5/2003 Hillinger ........... B05C 17/00536 401/2
6,747,251 B1 * 6/2004 Belanger ........... B05C 17/00546 219/535
6,838,642 B2 * 1/2005 Richardot ......... B05C 17/00546 219/229
6,891,130 B2 * 5/2005 Evanyk ............... B05C 17/0053 219/492
7,367,474 B2 * 5/2008 Lin ................... B05C 17/00546 222/113
9,586,229 B1 * 3/2017 Lee ..................... B05C 17/0053
2002/0192005 A1 * 12/2002 Chang ................. B05C 17/0053 401/2
2003/0150875 A1 * 8/2003 Belanger ........... B05C 17/00526 222/146.5
2004/0108335 A1 * 6/2004 Girouard .................. B44D 3/22 222/1
2004/0169053 A1 * 9/2004 Liljeqvist .......... B05C 17/00516 222/391
2004/0232165 A1 * 11/2004 Lee ..................... B05C 17/0053 222/146.5
2006/0081650 A1 * 4/2006 Axinte .............. B05C 17/00526 222/146.2
2006/0191957 A1 * 8/2006 Axinte .............. B05C 17/00526 222/146.5
2006/0196888 A1 * 9/2006 Agronin .............. B05C 17/0053 222/173
2008/0135644 A1 * 6/2008 Mangelsen ....... B05C 17/00526 239/296
2015/0209820 A1 * 7/2015 Ono .................... B05C 17/0053 222/146.5
2019/0283073 A1 * 9/2019 Belanger ........... B05C 17/00533
2024/0083082 A1 * 3/2024 Nakayama ............ B29C 45/231

FOREIGN PATENT DOCUMENTS

CN 117139090 A 12/2023
WO WO-2007035201 A2 * 3/2007 ....... B05C 17/00526

* cited by examiner

HOT MELT GUN

CROSS-REFERENCE TO RELATED APPLICATIONS

The application claims priority to Chinese patent application No. 2023210270270, filed on Apr. 28, 2023, the entire contents of which are incorporated herein by reference.

TECHNICAL FIELD

The present application relates to the technical field of processing equipment, and particularly relates to a hot melt gun.

BACKGROUND

The hot melt gun is an adhesive sealing and filling and gluing tool, and has a wide range of uses. In the working process of the hot melt gun of the prior art, the heat generated by melting the glue stick is easily to be transmitted to the hot melt gun housing, and the user would easily get scalded during long-term use; furthermore, a large amount of heat is transferred out, resulting in low processing efficiency and high energy consumption of the hot melt gun.

SUMMARY

At present, the hot melt gun of the prior art has the technical problems of inconvenience of hand scalding, high energy consumption and low processing efficiency, and the present application provides a hot melt gun for solving the above-mentioned problems.

A hot melt gun includes a housing having a cavity, a heating assembly mounted within the cavity and a connecting rod, wherein the housing is provided with a first through port; a heating assembly extends out of the housing from the first through port; and a connecting rod is a poor conductor of heat, and both ends thereof are respectively connected to the housing and the heating assembly, and the heating assembly is spaced apart from the housing.

Compared with the prior art, according to the hot melt gun provided by the present application, the heating assembly is spaced apart from the housing, a poor conductor of heat is selected as a connecting rod, the heating assembly is connected to the housing, the overall structure is simple and stable, the heat generated by the heating assembly during processing directly acts on the glue stick, and it is not easy to transfer heat to the housing, so as to ensure that the user is not scalded during long-term use, the heat loss is reduced, and the heating efficiency is improved.

BRIEF DESCRIPTION OF DRAWINGS

In order to more clearly illustrate the technical solutions in the embodiments of the present application, the drawings used in the description of the embodiments will be briefly introduced below, it is obvious that the drawings in the following description are only some embodiments of the present application, and other drawings can be obtained by a person skilled in the art without inventive efforts, where.

DETAILED DESCRIPTION OF THE EMBODIMENTS

The technical solutions of the embodiments of the present application will be clearly and completely described below with reference to the accompanying drawings of the embodiments of the present application. Apparently, the described embodiments are only a part of the embodiments of the present application, rather than all the embodiments. Based on the embodiments in the present application, all the other embodiments obtained by a person skilled in the art without involving any inventive effort fall within the scope of protection of the present application.

Figure 1:
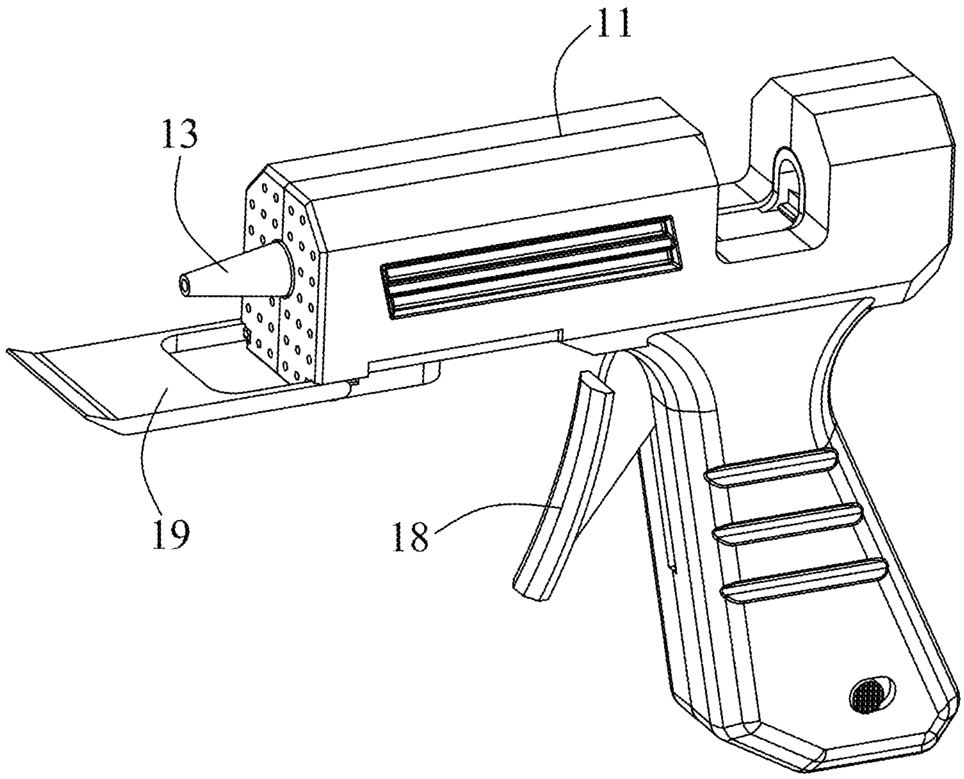
FIG. 1 is a stereochemical schematic structural diagram of a hot melt gun according to the present application.
Figure 2:
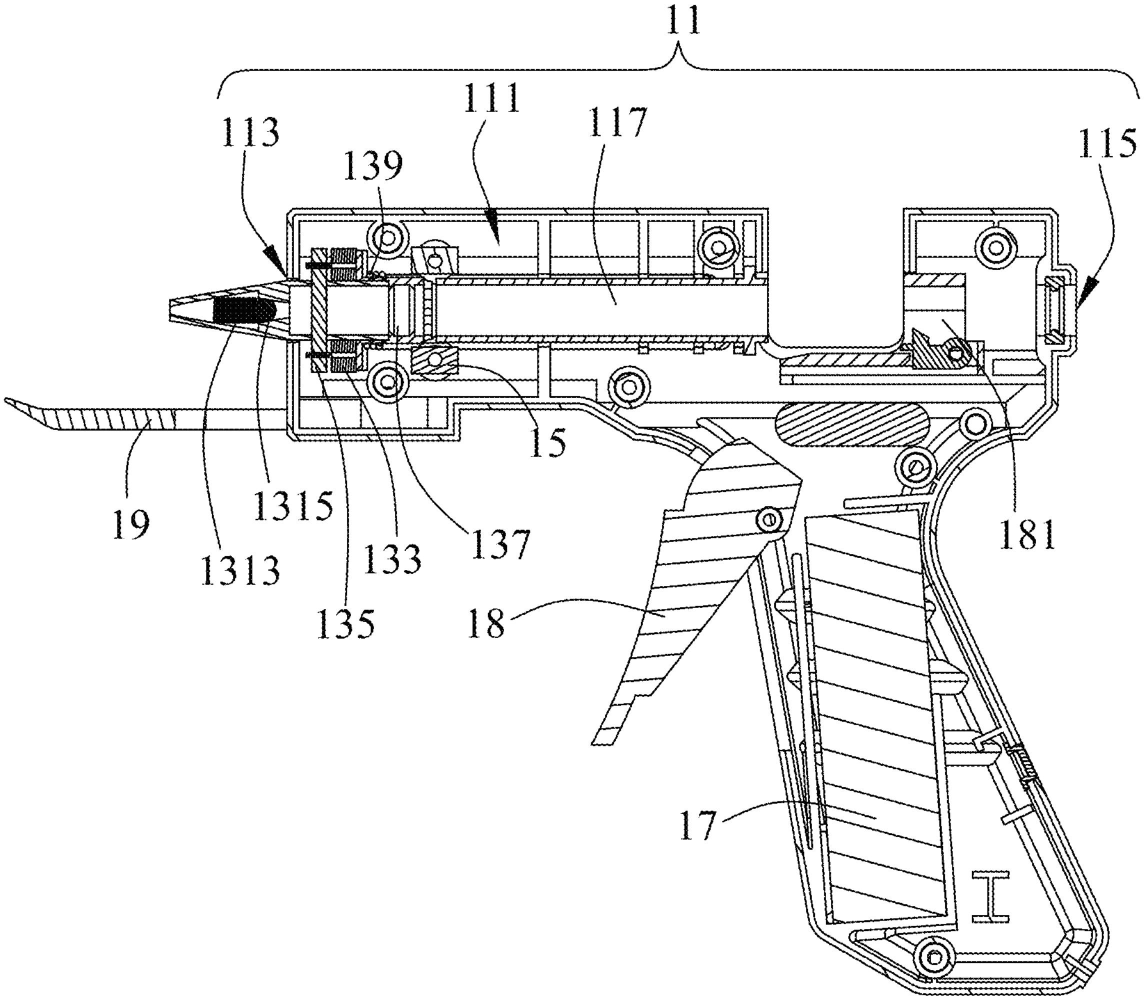
FIG. 2 is a cross-sectional view of a hot melt gun according to the present application.

With reference to FIGS. 1 and 2, FIG. 1 is a stereochemical schematic structural diagram of a hot melt gun according to the present application, and FIG. 2 is a cross-sectional view of a hot melt gun according to the present application. The hot melt gun 100 includes a housing 11 having a cavity 111, a heating assembly 13 mounted in the cavity 111, a connecting rod 15 for fixedly connecting the housing 11 and the heating assembly 13, a power supply assembly 17 for supplying a heating power source, and a switch assembly 18 for pushing the glue stick and controlling the heating assembly to heat the glue stick. The connecting rod 15 is a poor conductor of heat, and both ends thereof are respectively connected to the housing 11 and the heating assembly 13, and the heating assembly 13 is spaced apart from the housing 11. The heating assembly 13 is not in direct contact with the housing 11, and there is a certain gap therebetween.

The connecting rod 15 is a poor conductor of heat, such as titanium alloy, asbestos, ceramic, etc. and when the heating assembly 13 is operated, the generated heat is not easily transferred to the housing 11, reducing the temperature of the housing 11, facilitating a user to use, avoiding the loss of thermal energy, and improving the processing efficiency. In the present embodiment, the connecting rod 15 is preferably a titanium alloy. The way by which the connecting rod 15 is connected to the housing 11 is not limited, and the way may be welding, screwing or riveting.

The power supply assembly 17 and the switch assembly 18 are both provided in the housing 11 and are connected and matched with the heating assembly 13. In the present embodiment, the power supply assembly 17 is powered by a battery, however, in another embodiment, the power supply assembly 17 may be powered by an in-line power supply, without limitation.

The housing 11 is provided with a first through port 113 and a second through port 115, the first through port 113 and the second through port 115 are both oppositely arranged at both ends of the cavity 111, and a glue stick tube 117 is further arranged in the cavity 111, and the glue stick tube 117 is used for receiving a glue stick. The glue stick enters the interior of the housing 11 from the second through port 115, penetrates the glue stick tube 117, and remains relatively stable in position for processing close to the heating assembly 13 via the switch assembly 18. The switch assembly 18 is provided with a push tube 181, the second through port 115 is arranged opposite to the push tube 181, the heating assembly 13 and the first through port 113, and after the glue stick is put in, a user controls the push tube 181 to drive the glue stick into the heating assembly 13.

In the present embodiment, the hot melt gun 100 further includes a bracket 19. The bracket 19 is provided on a side of the housing 11 adjacent to the first through port 113 for supporting the placing of the housing 11, and the bracket 19 is rotatable at a certain angle with respect to the housing 11, and is easy to disassemble and clean, so as to save space during storage. Moreover, the bracket 19 can also be used to block the overflowing hot melt glue, facilitate subsequent cleaning, and avoid spilling on the work surface or material to be worked.

Figure 3:
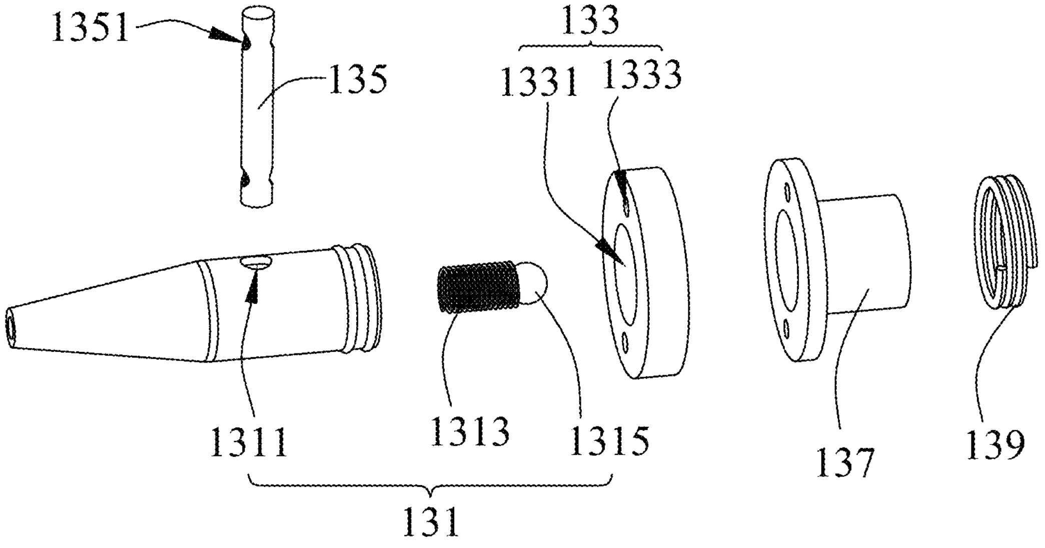
FIG. 3 is an exploded perspective view of a heating structure shown in FIG. 2.

Reference is now made to FIGS. 2 and 3, where FIG. 3 is an exploded perspective view of a heating assembly shown in FIG. 2. The heating assembly 13 includes a nozzle 131 perforated at both ends, a heater 133 having a central through hole 1331, a heat transfer rod 135, a sleeve 137 and a first spring 139 sleeved outside the sleeve 137, where one end of the nozzle 131 penetrates through the central through hole 1331 and is connected to the sleeve 137, and the other end thereof protrudes from the first through port 113 to the outside of the housing 11 for glue outlet. The heat transfer rod 135 penetrates through the nozzle 131 from the side and is connected to the heater 133 via the connecting rod 15, ensuring that the passing glue stick is heated in sufficient contact with the heat transfer rod 135.

In the present embodiment, the connecting rod 15 connects the nozzle 131, the heater 133, the heat transfer rod 135, and the sleeve 137 together, in a manner that is not limited thereto. Of course, in another embodiment, the connecting rod 15 connects the nozzle 131, the heat transfer rod 135 and the sleeve 137 together, and the heater 133 is sleeved in the nozzle 131 adjacent to the heat transfer rod 135 and spaced apart from the connecting rod 15.

The heater 133 may be a resistance wire heater or a ceramic heater, where the ceramic heater may be a PTC ceramic heater or a MCH ceramic heater. In the present embodiment, a PTC ceramic heater is preferred, which is reliable in operation, durable, energy efficient, and inexpensive.

In the present embodiment, the nozzle 131 is provided with a first perforation 1311, the heater 133 is provided with a second perforation 1333, the heat transfer rod 135 is provided with a third perforation 1351, and the sleeve 137 is provided with a fourth perforation 1371, the heat transfer rod 135 penetrates the first perforation 1311 to be fixedly connected to the nozzle 131, and the connecting rod 15 penetrates the third perforation 1351, the second perforation 1333 and the fourth perforation 1371 in sequence to be respectively connected to the heat transfer rod 135, the heater 133 and the sleeve 137. The connection structure is simple and compact, the internal space is saved, the whole heating environment range is small, and the heating efficiency is improved.

In the present embodiment, the first perforations 1311, the second perforations 1333, the third perforations 1351 and the fourth perforations 1371 are all preferably provided in a number of two, and every two of them are symmetrically arranged. The number of the connecting rods 15 is also two, corresponding to the number of the first perforations 1311, the second perforations 1333, the third perforations 1351, and the fourth perforations 1371 on a one-to-one basis. Of course, the specific number is not limited herein and may be varied according to structural and stability requirements.

A second spring 1313 and a ball 1315 are further provided in the nozzle 131, where one end of the second spring 1313 abuts against one end opening of the nozzle 131 and the other end abuts against the ball 1315. The ball 1315 is located between the second spring 1313 and the heat transfer rod 135, and when the glue stick is heated and melted, the ball 1315 and the second spring 1313 are pressed so as to flow out through the nozzle 131, and when the ball 1315 and the second spring 1313 are not pressed, the second spring 1313 presses the ball 1315 by the restoring force of the spring and abuts against the nozzle 131 adjacent to the outlet of the heat transfer rod 135, so as to prevent the hot melt glue from overflowing.

Figure 4:
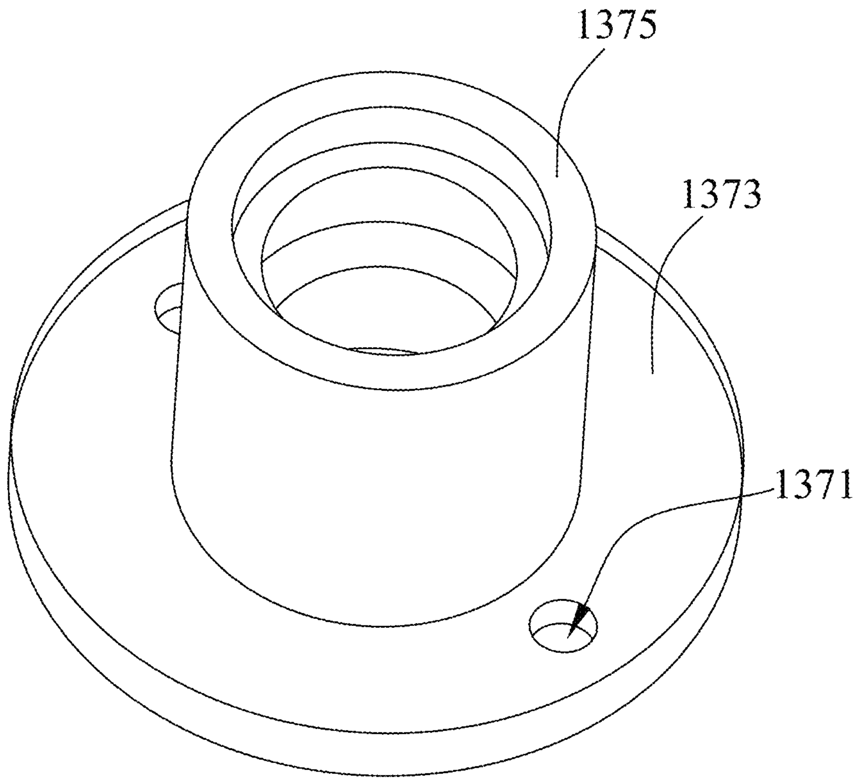
FIG. 4 is a schematic structural diagram of a sleeve shown in FIG. 3.

Referring to FIG. 4, FIG. 4 is a schematic structural diagram of a sleeve shown in FIG. 3. The sleeve 137 includes a sleeve base 1373 and a flexible hose 1375, where a protrusion is provided inside the flexible hose 1375, the diameter of one side close to the sleeve base 1373 is smaller than that of the other side away from the sleeve base 1373, and the first spring 139 is tightly sleeved outside the flexible hose 1375. After penetrating the sleeve 137, the glue stick sufficiently contacts with the heat transfer rod 135 inside the nozzle 131 and melts. When the user closes the switch assembly 18, since the push tube 181 no longer pushes the glue stick, the glue stick may move in the opposite direction, and the structural design of the flexible hose 1375 in combination with the fastening action of the first spring 1375 can achieve the position fixing effect on the glue stick, so as to avoid the above-mentioned case.

Compared with the prior art, according to the hot melt gun 100 provided by the present application, the heating assembly 13 is spaced apart from the housing 11, a poor conductor of heat is selected as a connecting rod 15, the heating assembly 13 is connected to the housing 11, the overall structure is simple and stable, the heat generated by the heating assembly 13 during processing directly acts on the glue stick, and it is not easy to transfer heat to the housing 11, so as to ensure that the user is not scalded during long-term use, the heat loss is reduced, and the heating efficiency is improved.

Moreover, the layout design of each structure of the heating assembly 13 is simple and compact, the internal space is saved, the range of the overall heating environment is small, and the heating efficiency is improved. Where the design of cooperating the sleeve 137 with the first spring 139 also helps to fix the position of the glue stick and prevent backflow; the heat transfer rod 135 penetrates the nozzle 131 to ensure sufficient heating of the glue stick and improve the heating efficiency; the design of cooperating the second spring 1313 with the ball 1315 has an effect of preventing overflow; the bracket 19 integrates the function of the support frame body and the tray, and can not only achieve the support for the housing 11, but also can be used to block the overflowing hot melt glue, facilitate subsequent cleaning, avoid spilling on the work surface or material to be worked, and the design is simple and reasonable and saves costs.

The above-mentioned embodiments are merely embodiments of the present application, and it should be pointed out here that a person skilled in the art would have been able to make improvements without departing from the inventive concept of the present application, but these are all within the scope of protection of the present application.

What is claimed is:

1. A hot melt gun, comprising:

a housing having a cavity, the housing being provided with a first through port;

a heating assembly mounted within the cavity and extending out of the housing from the first through port; and a connecting rod, wherein the connecting rod is a poor conductor of heat, and both ends thereof are respectively connected to the housing and the heating assembly;

wherein the heating assembly comprises a nozzle perforated at both ends, a heater having a central through hole, a heat transfer rod, and a sleeve, one end of the nozzle penetrates the central through hole to be connected to the sleeve, and the heat transfer rod is connected to the heater from the side through the nozzle via the connecting rod.

2. The hot melt gun according to claim 1, further comprising a power supply assembly and a switch assembly, wherein the power supply assembly and the switch assembly are both provided within the housing and connected to the heating assembly, the power supply assembly is used for providing a heating power source, the switch assembly is used for pushing a hot melt glue stick and controlling the heating assembly to heat the glue stick.

3. The hot melt gun according to claim 2, wherein the housing further comprises a second through port, the switch assembly is provided with a push tube, the second through port is provided opposite to the push tube, the heating assembly and the first through port for penetrated insertion of the glue stick, and the switch assembly is used for controlling the push tube to drive the glue stick into the heating assembly.

4. The hot melt gun according to claim 1, wherein the nozzle is provided with a first perforation, the heater is provided with a second perforation, the heat transfer rod is provided with a third perforation, and the sleeve is provided with a fourth perforation, the heat transfer rod penetrates the first perforation to be fixedly connected to the nozzle, and the connecting rod penetrates the third perforation, the second perforation and the fourth perforation in sequence to be respectively connected to the heat transfer rod, the heater and the sleeve.

5. The hot melt gun according to claim 4, wherein the first perforations, the second perforations, the third perforations and the fourth perforations are all provided in a number of two.

6. The hot melt gun according to claim 4, wherein a glue stick tube is further provided in the cavity and used for receiving the glue stick and having one end provided opposite to the sleeve, and the sleeve is spaced apart from the glue stick tube.

7. The hot melt gun according to claim 1, wherein the heating assembly further comprises a first spring, the sleeve comprises a sleeve base and a flexible hose, the flexible hose is internally provided with a stepped protrusion, the radius of one side adjacent to the sleeve base is smaller than that of the other side away from the sleeve base, and the first spring is closely sleeved outside the flexible hose.

8. The hot melt gun according to claim 1, wherein a second spring and a ball are provided in the nozzle, and one end of the second spring abuts against one end opening of the nozzle and the other end abuts against the ball.

9. The hot melt gun according to claim 1, further comprising a bracket provided on a side of the housing adjacent to the first through port for supporting the housing and blocking the overflowing hot melt glue.

* * * * *